Figure 1:
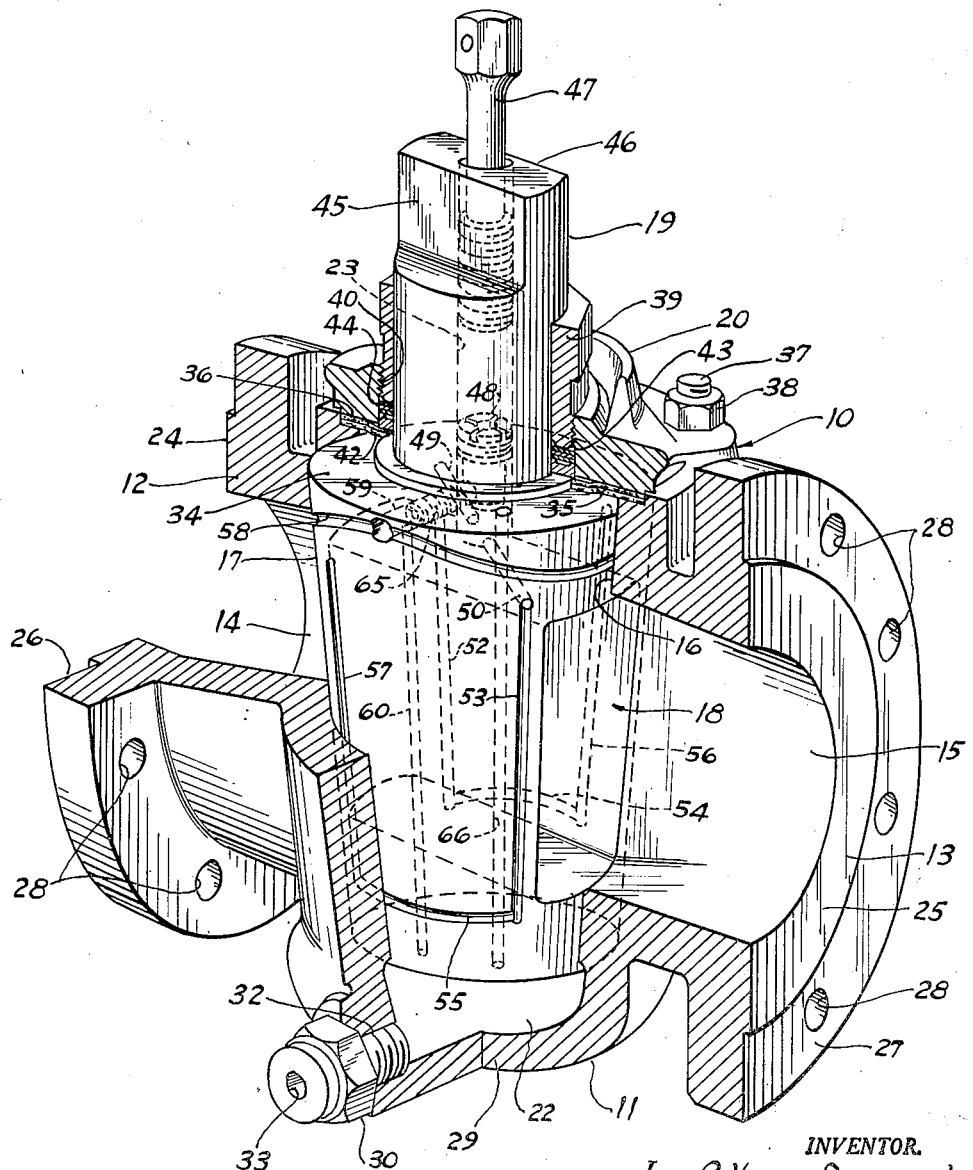

May 15, 1951  J. C. HAUN  2,552,967
PLUG VALVE
Filed Jan. 10, 1947

INVENTOR.
Joye C. Haun, Deceased
By Florence Patricia Mills, Executrix
By Albert G. McCaleb
Attorney Patented May 15, 1951

2,552,967

UNITED STATES PATENT OFFICE 2,552,967

PLUG VALVE

Joye C. Haun, deceased, late of San Francisco, Calif., by Florence Patricia Mills, executrix, Wallowa, Oreg., assignor to Florence Patricia Mills, Wallowa, Oreg.

Application January 10, 1947, Serial No. 721,348

1 Claim. (Cl. 251—93)

This invention relates to plug valves, and more particularly to such valves of the lubricated tapered plug type wherein the lubricant has additional functions, such as serving as a sealing compound and as a force transmitting medium for effecting relief of the parts when they tend to stick.

It is an object of the present invention to provide a plug valve of the tapered plug type wherein both ends of the plug are subjected to lubricant pressure during the jacking of the valve plug, but wherein the effective area under pressure at the small end of the plug exceeds that at the large end of the valve to an extent that the plug may be readily jacked for relief of sticking.

The invention further comprehends the provision of a plug valve of the tapered plug type wherein both ends of the valve plug are subjected to lubricant under pressure in such a way that said lubricant resists the leakage of material from the controlled line into the space at the large end of the plug when the plug is jacked for relief of sticking.

For another object, the invention comprehends the provision of a plug valve so constructed and arranged that lubricant under pressure distributes the axial force from the valve plug over the area of the housing cover plate, whereby the plug is firmly held in place and the bending moment on the cover plate is minimized.

Other objects and advantages of the invention will be apparent from the following description and the accompanying drawings.

The single figure of the drawing is a perspective view of a valve embodying a preferred form of the invention and wherein the valve housing is longitudinally sectionalized along angularly disposed planes to show the details of the housing structure in section and the valve plug in elevation.

In its more general aspects, the valve 10 which is depicted in Fig. 1 for illustrative purposes has a housing 11 provided at opposite ends with flange-type connecting portions 12 and 13. Opposed ports 14 and 15 provide inlet and outlet openings for the valve and communicate with a frusto-conical bore 16 the axis of which frusto-conical bore is transverse to the axes of the ports 14 and 15. Seated within the frusto-conical bore 16 and adapted to be rotated therein is a frusto-conical valve plug 17 provided with a through bore 18 transverse to the axis of the valve plug and disposed at a position for providing communication between the ports 14 and 15 in the housing when the plug is turned to a position of alignment with the housing ports.

At its upper end the valve plug 17 has a cylindrical stem 19 secured thereto and projecting axially from the end surface of the plug. A cover plate 20 surrounds the stem 19 and covers the frusto-conical bore at the larger end of the plug so that assembly and removal of the plug with respect to the housing may be accomplished by placement and removal of the cover plate. Adjacent the smaller end of the valve plug 17 the housing is formed to provide a lubricant chamber 22 in which chamber lubricant pressure may be built up to effect a jacking force upon the plug to relieve it in the event of its freezing in one position.

As will be more fully explained, the valve stem 19 has therein a cylindrical bore 23 which extends into the end portion of the plug and provides a lubricant chamber. Also the plug is provided with a system of external grooves and passages communicating therewith through which grooves and passages the co-acting frusto-conical seating surfaces of the plug and housing are provided with lubricant for both sealing and lubricating purposes.

Considered more in detail, the flange-type connecting portions 12 and 13 of the valve housing have their seating surfaces 24 and 25 respectively from which flanges 26 and 27 project radially. The usual circumferentially spaced apertures 28 extend axially through the flanges 26 and 27 to accommodate fastening elements such as bolts for securing the valve to adjoining fittings.

Although the outer ends of the ports 14 and 15, as well as the seating surfaces 24 and 25 and the flanges 26 and 27, are desirably circular for convenience in making connections to the usual forms of pipes or pipe fittings, the through bore 18 in the disclosed type of valve is, by preference, substantially rectangular. Thus, the internal surfaces of the ports 14 and 15 are so conformed that they smoothly change in shape between their inner and outer ends so as substantially to align at their inner ends with the ends of the through bore 18.

In the position of the valve shown in Fig. 1, the plug 17 is disposed to provide full communication between the inlet and outlet ports of the valve housing. When rotated 90° from the position shown in Fig. 1, the seating surfaces of the plug completely close the inner ends of the ports 14 and 15 and thus stop all fluid flow through the valve. Since there is sometimes a tendency for plug valves to stick or become frozen in a position to which they have been set, particularly when used in a high pressure system, it is desirable that the frusto-conical plug may be moved outwardly of the housing in the direction of its taper in order to relieve the seating surfaces before the plug is turned. The force of lubricant under pressure within the chamber 22 at the small end of the plug 17 is utilized for effecting the desired axial movement of the plug in the disclosed valve.

At one side of a lower wall 29 of the valve housing a pressure fitting 30 is threaded into an aperture 32 which communicates with the interior of the lubricant chamber 22. This pressure fitting 30 has a lubricant passage 33 and is provided internally with a suitable type of pressure actuated check valve so that lubricant may be introduced into the chamber therethrough but leakage is prevented between the applications of external lubricant pressure.

In order to allow limited axial movement of the plug 17 within the housing and yet maintain a fluid-tight seal at the end of the frusto-conical bore therein, the cover plate 20 is axially spaced from a substantially plane end surface 34 of the plug and a seal is effected between the housing and the plug by parts including a flexible diaphragm 35. The outer edge of the diaphragm 35 is clamped between a shoulder 36 adjacent the frusto-conical bore in the housing and the outer edge of the cover plate 20. In the illustrated valve, studs such as 37 are secured to the housing and project through apertures in the cover plate 20 and are provided with nuts such as 38 for holding the cover plate in place.

A gland 39 fits over the cylindrical surface of the stem 19 and is threaded into a central bore 40 in the cover plate. A pressure ring 42 rests against the surface of the diaphragm 35 adjacent the stem 19 and is movable axially within the bore 40. An inner end surface 43 of the gland 39 is desirably curved and presses against a plurality of flexible resilient rings 44 to bias the pressure ring 42 downwardly against the surface of the diaphragm, thus holding the diaphragm tightly against the surface 34 of the plug. The surface of the pressure ring 42 adjacent the resilient rings 44 is channeled so that a sufficient force upwardly against the bottom of the plug will flex the resilient rings at the channeled surface of the pressure ring, thereby to permit a limited axial movement of the plug.

Due to the tapering of the seating surfaces of the housing and plug, an upward movement of the plug toward its larger end and against the action of the resilient rings 44 frees the plug for turning movement by a wrench or handle fitted onto flattened surfaces 45 and 46 at the end of the stem 19. The gland 39 is tightened to an adjusted position in which it exerts a desired and effective holding pressure against the surfaces of the resilient rings 44.

A plunger 47 is threaded into the outer end of the cylindrical bore 23 in the stem 19. Within the bore 23 and near its lower end is a check valve 48 which is disposed to function in a manner such that it will permit lubricant under pressure to move downwardly through the stem bore 23, but will check its return movement.

Below the check valve 48 opposed lateral bores 49 and 50 in the plug 17 provide communication between the stem lubricant chamber and longitudinally extending grooves 52 and 53 in the seating surface of the plug. The grooves 52 and 53 are spaced from, but extend along opposite side edges of, the through bore 18 in the plug. Preferably those grooves are somewhat longer than the side edges of the through bore and the passages 49 and 50 open into the grooves at positions displaced axially of the plug and toward the larger end surface of the plug from the near end surface of the through bore 18. Near the smaller end surface of the plug and below the level of the lower end surface of the through bore 18, circumferential grooves 54 and 55 communicate with the ends of the grooves 52 and 53 respectively opposite the passages 49 and 50 and extend around the seating surface of the plug to a position spaced from but near the opposite ends of the through bore. At their ends which are displaced from the grooves 52 and 53 the grooves 54 and 55 communicate with grooves 56 and 57 respectively which extend longitudinally along opposite side edges of the through bore 18 in spaced relationship thereto.

Through this portion of the system of grooves in the plug 17 lubricant moves outwardly from the lower end of the stem chamber 23 through the passages 49 and 50 to the upper ends of the grooves 52 and 53 respectively. Through the grooves 52 and 53 the lubricant passes to the grooves 54 and 55 respectively and thence upwardly through the grooves 56 and 57 respectively. When the valve is in the open position as shown in Fig. 1, the grooves 52 and 56 are disposed along opposite side edges of the through bore 18 at one end thereof, while the grooves 53 and 57 are disposed along opposite side edges of the through bore 18 at the other end thereof. During turning movement of the plug the lubricant in the grooves is spread across the seating surfaces of the tapered bore of the housing. When the valve is in the closed position, the grooves 53, 55 and 57 frame three sides of the port at one end of the valve and the connected grooves 52, 54 and 56 frame three sides of the port at the other end of the valve. Such framing of the ports improves the sealing of the valve, particularly in its "off" position and especially if a proper type of lubricant is used for the purpose.

In addition to the aforementioned grooves in the seating surface of the plug, a circumferential groove 58 desirably extends around the plug in a path which is wavy in order that the lubricant from the groove is spread over an area of the seating surfaces which is wider than the groove itself. The groove 58 is axially disposed between the larger end of the plug and the near edges of the through bore 18. A bore 59 extending radially into the plug from the groove 58 connects that groove to the lubricant chamber below the check valve 48 and provides a passage through which lubricant from the chamber flows into and around the groove.

In the disclosed valve structure the passage 59 is connected at its mid portion, and through a passage 60 which extends longitudinally through the plug, to the housing lubricant chamber 22. Furthermore, a check valve 65 is threaded into the passage 59 and disposed therein at a position between the lubricant chamber 23 and the passage 60. This check valve may be one of the well known types such as a valve utilizing a spring-urged ball control element suitable to effect unidirectional flow through the passage.

The check valve 65 is so disposed within the passage 59 that pressure applied to the lubricant within the chamber 23 acts to produce a flow through the check valve and outwardly from the chamber 23 to the outer end portion of the passage 59 and to the passage 60. On the other hand, the check valve 65 prevents the return flow of lubricant from the passage 59 to the lubricant chamber 23.

With the check valve 65 thus installed in the passage 59, the lubricant chambers 23 and 22 are interconnected in such a way that pressure applied to the lubricant within the chamber 23 not only forces lubricant outwardly therefrom and into the connected passages and grooves, but also increases the pressure upon the lubricant in the chamber 22 so that jacking force may be applied to the valve plug by operation of the plunger 47. However, since the lubricant in the chamber 22 is more likely to become contaminated by material from the line controlled by the valve than is that in the stem 23, it is desirable to prevent the flow of lubricant from the chamber 22 to the stem chamber 23 through the passage 60. The check valve 65 serves this purpose. It thus insures the flow of clean and uncontaminated lubricant from the stem chamber 23 to the grooves 52, 53, 54, 55, 56 and 57. The check valve 65 also prevents the forcing of lubricant into the grooves 52, 53, 54, 55, 56 and 57 when jacking force is applied to the valve plug through the introduction of lubricant under pressure into the housing chamber 22.

With the disclosed arrangement of grooves utilized in combination with the passages and check valves shown, the plug may be turned so as to expose the grooves 56 and 57 to the line ports; whereupon the introduction of lubricant into the stem chamber 23 and the application of pressure thereto may be utilized to push lubricant from the grooves 52, 53, 54, 55, 56 and 57 into the line ports without disturbing the lubricant in the chamber 22. With the valve in such a position, lubricant may also be forced into the housing chamber 22 without extruding that material into the line ports.

In addition to the described system of passages and ports which are utilized for effecting lubrication of the valve seats and jacking the valve plug to relieve it when stuck, the disclosed valve includes a bore 66 extending longitudinally from end to end of the valve plug so as to provide a passage for the flow of lubricant from the chamber 22 to the space between the plane end surface 34 of the plug and the sealing diaphragm 35. The pressure of the lubricant in the space at the larger end of the valve plug will be substantially equal at all times to the pressure of the lubricant in the chamber 22. It is, therefore, necessary to the accomplishment of the jacking of the valve plug 17 upwardly to relieve it from binding engagement with the housing seat, that the total area of the smaller end of the plug which is subjected to lubricant pressure in an axial direction shall be larger than the exposed area of the large end of the plug. In the present instance the valve stem 19 has a diameter which is sufficient to reduce the exposed area of the large end of the valve plug to an area which is substantially less than the effective area of the valve which is subjected to the pressure of the lubricant within the housing chamber 22. Thus, even though the lubricant at the upper end of the valve plug is under pressure, the plug may be readily and effectively jacked by either the application of pressure to the lubricant in the chamber 23 or the introduction of lubricant under pressure into the housing chamber 22.

In addition to the lubrication of the sealed end of the valve plug, the lubricant confined at that end of the plug produces additional advantageous results. The pressure of the lubricant in that space being outwardly and downwardly when jacking force is applied to the plug, the lubricant prevents any material from the line ports 14 and 15 from leaking upwardly into the space at the end of the plug while its seating pressure is relieved. It is a further advantage for the introduction of lubricant under pressure into the space at the larger end of the plug and between that end of the plug and the closure cap 20, that the lubricant thus confined distributes pressure from the plug over the area of the cover plate to hold the plug firmly in place and to reduce the bending movement otherwise exerted upon the cover plate.

While a preferred embodiment of this invention has been illustrated, many modifications may be made without departing from the spirit of the invention, and it is not intended that the invention is to be limited to the precise details of the construction set forth, but shall include all of the changes within the scope of the appended claim.

Having thus described the present invention, what is claimed as new and desired to be secured by Letters Patent of the United States is:

A lubricated valve comprising, in combination, a housing provided with a frusto-conical bore presenting a seating surface and having inlet and outlet ports communicating with the bore, a frusto-conical plug having a seating surface fitted for rotational movement in said bore and having a passage therethrough for connecting the inlet and outlet ports when the plug is in a predetermined position relative to the housing and closing said ports when rotated to another position, said plug having a stem projecting from one end thereof, said stem having a lubricant chamber therein for holding a supply of lubricant, means for applying pressure to the lubricant in said chamber, closure means secured to said housing and surrounding said stem, one of said seating surfaces having a system of lubricant grooves therein from which lubricant is spread over the seating surfaces when the plug is rotated in the housing, said housing having a second lubricant chamber therein at the end of the plug opposite the stem, means providing an inlet for lubricant under pressure to the last mentioned chamber so as to apply lifting force against the end of the plug, said plug having a passage therein extending from the stem lubricant chamber to the system of grooves, for supplying lubricant directly from the stem lubricant chamber to the system of grooves, a second passage separate from the aforementioned passage connecting said lubricant chambers, a check valve in the second passage adjacent the stem lubricant chamber for restricting the flow of lubricant to a direction from the stem lubricant chamber through the last mentioned passage, said plug also having a longitudinal passage separate from the aforementioned passages which extends therethrough from end to end to provide for the flow of lubricant from said second lubricant chamber to the end of said plug adjacent the closure means, and the area of the last mentioned end of the plug which is exposed to lubricant being smaller than the area of the plug exposed to lubricant within said second lubricant chamber.

FLORENCE PATRICIA MILLS,
*Executrix of the Last Will and Testament of Joye C. Haun, Deceased.*

REFERENCES CITED

The following references are of record in the file of this patent:

UNITED STATES PATENTS

| Number | Name | Date |
|---|---|---|
| 2,026,891 | Haren | Jan. 7, 1936 |
| 2,029,438 | Nordstrom | Feb. 4, 1936 |
| 2,048,385 | Jacobsen | July 21, 1936 |
| 2,069,013 | Nordstrom | Jan. 26, 1937 |
| 2,151,098 | Greenwood | Mar. 21, 1939 |
| 2,319,943 | Nordstrom | May 25, 1943 |